March 3, 1959  C. J. BADER ET AL  2,876,388
AIRCRAFT WARNING DEVICES

Filed Nov. 21, 1956  3 Sheets-Sheet 1

INVENTORS
CLIFFORD J. BADER
RUDOLPH A. COLA
BY
Laurence R. Brown
ATTORNEY

March 3, 1959

C. J. BADER ET AL 2,876,388

AIRCRAFT WARNING DEVICES

Filed Nov. 21, 1956

INVENTORS
CLIFFORD J. BADER
RUDOLPH A. COLA
BY
Lawrence R. Brown
ATTORNEY

INVENTORS
CLIFFORD J. BADER
RUDOLPH A. COLA
BY
Lawrence R. Brown
ATTORNEY

United States Patent Office 2,876,388
Patented Mar. 3, 1959

2,876,388

AIRCRAFT WARNING DEVICES

Clifford J. Bader, Phoenixville, Pa., and Rudolph A. Cola, Camden, N. J., assignors to Burroughs Corporation, Detroit, Mich., a corporation of Michigan Application November 21, 1956, Serial No. 623,559

13 Claims. (Cl. 315—292)

This invention relates generally to visual warning devices for aircraft and more particularly it relates to switching circuits for sequential operation of a plurality of visual flash tubes mounted on an airplane fuselage in a timed sequence.

Under conditions of low visibility it is difficult to detect an aircraft, and furthermore if only a fleeting glance is obtained it may be impossible to gauge the relative speed, direction and distance. This is particularly true at night or in conditions of fog or rain. Accordingly it is desirable to provide a system of warning lights for aircraft which will provide a high degree of visibility, together with provision of a reliable indication of the outline of the aircraft and the direction in which the aircraft is traveling. Thus it is desired that by a single glance through a cloud blank, or in other conditions of poor visibility, it will be evident in which direction the plane is traveling, and a general idea will be conveyed of the size and outline of the plane together with a visual estimate of relative speed.

In warning systems of this type it is desirable to provide high intensity flashing lights outlining the fuselage of an airplane by location at several points thereupon, and for giving an indication of the direction in which a plane is traveling by a sequential flashing in a particular manner. Thus the lights must be rapidly flashed in a fixed timing sequence in order to give desired information. A system therefore must be provided to give high visibility lighting responsive to instantaneous flashing of specific lights from a controlled switching system. In the switching system it is also desirable to provide for entirely electronic control in order to eliminate mechanically actuated contacts for breaking high current paths. In addition to unreliability of contacts because of burning or poor contact under certain conditions, they are highly undesirable because of the radio interference problem resulting from arcs at the contacts. Accordingly an entirely electronic system without any switching contacts or other mechanically movable parts is desirable in an aircraft warning system.

It is further a problem, in order to provide instantaneous flashing at high intensity, to afford a large current flow for each sequential operation of the lamp at different remote positions upon the aircraft fuselage. Usually this requires inter-connecting leads capable of handling large currents without distortion of waveforms or interference with existing intra-aircraft wiring or other equipment. The provision of high current leads is therefore undesirable and expensive. Accordingly an electronic system is desirable which is operable at several remote positions with inter-connecting circuits requiring small currents.

It is therefore an object of the present invention to provide a reliable aircraft warning system for flashing a plurality of high intensity lights in a predetermined sequence.

Further it is an object of the invention to provide an all electronic aircraft warning system, which does not require any switching contacts or movable parts.

A further object of the invention is to provide an aircraft switching system for actuating warning lights in a predetermined sequence in such a manner that freedom from radiation of electro-magnetic waves is possible.

Accordingly there is provided in accordance with the present invention, an aircraft warning device comprising a series of gaseous discharge lights mounted at different positions upon an aircraft fuselage. Actuation of these lights is accomplished in a predetermined sequence by means of an electronic switching system. The electronic switching system comprises a beam switching tube which electronically selects the desired sequence of timing without using movable contacts.

Provisions are made for stepping the beam in the beam switching tube from position to position at a periodic frequency, wherein the dwell time upon each output electrode of the beam switching tube has a predetermined fixed time period. A low current impulse conveying circuit is coupled to suitable output positions of the beam switching tube and is directed to the various lights mounted at remote positions on the aircraft fuselage in order to provide coupling without necessity of high current leads. The switching sequence is determined by the interconnection of the various lights with a predetermined pattern of output beam switching tube positions to provide the desired flashing pattern. In one typical embodiment of the invention, for example, a series of three adjacent positions is used in order to provide flashing of three lights upon one scanning cycle of a ten position beam switching tube, thereby providing with the remaining seven positions of the beam switching tube a spacing period between the flashing of three lamps on each beam scanning cycle. Provisions are made in one embodiment for actuating alternative sets of lamps on alternate scanning cycles. These sets of lamps, for example, would be mounted upon the top and bottom sections of the airplane fuselage and the switching circuits provide such a timing sequence that the direction of travel can be determined. In order to actuate various lamps without disturbing the loading characteristics or reliability of the beam switching tube, gating circuits are provided so that different lamp circuits are alternately actuated from the same electrodes on different scanning cycles thereby providing for a constant load circuit at each beam position in the switching system.

In order to prevent high current flow between the central switching system and a plurality of remotely actuated lamp devices, a discharge circuit for each lamp is provided at the lamp station. This discharge circuit comprises a gaseous thyratron tube which may be triggered by a voltage impulse transmittable between the central unit and the remote units in the low current transmission line. Likewise in order to flash a lamp without requiring heavy current flow in the connecting cables, a capacitor is charged from a high voltage source at low current value, and is discharged through the low impedance thyratron tube when it is fired, in order to provide instantaneous current sufficiently high to flash the light at the remote station. It is evident therefore that in accordance with the present invention an improved aircraft warning system is provided which will provide reliable electronic switching control of a series of warning lights without utilization of movable contacts, and without necessitating high current flow in interconnecting leads passed throughout the aircraft.

Other objects and features of advantage of the present invention will be found throughout the following specification and claims, and may be best understood by detailed consideration of this specification in connection with the accompanying drawing, in which:

Figure 1:
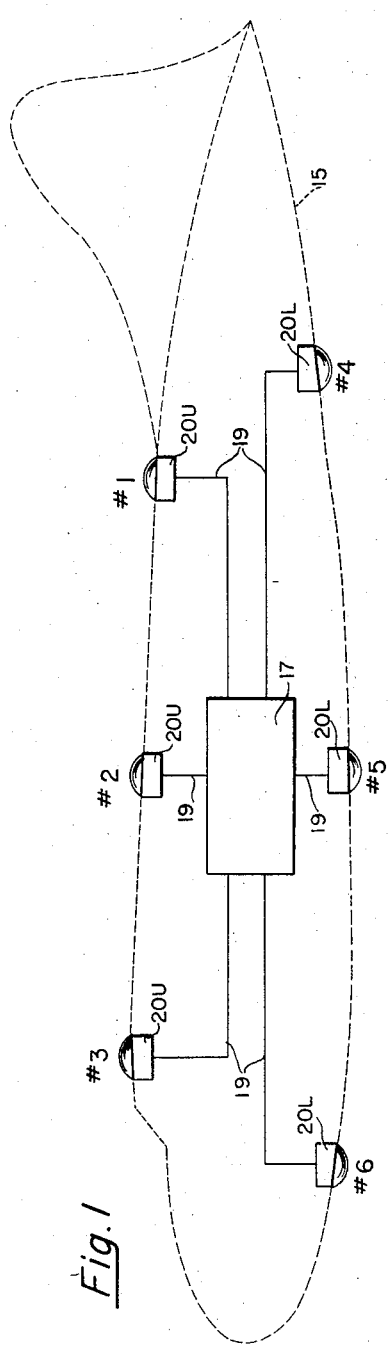
Fig. 1 is a diagrammatic view of the placement of warning lights upon an aircraft fuselage and the manner in which they are interconnected from a central switching system.

In Fig. 1 is shown a typical aircraft installation of warning lamps. Thus the fuselage of the aircraft 15 has located thereupon a series of lamps numbered one through six located with the lamps 1, 2 and 3 respectively on the upper portion of the fuselage numbered from aft to fore, and with lamps 4, 5 and 6 on the bottom part of the fuselage and numbered also from aft to fore. It is therefore seen that by sequentially actuating the lamps 1, 2, 3 pausing and actuating lamps 4, 5 and 6 that not only will the direction of travel and approximation of the speed of the aircraft be shown, but in addition the outline of the size and shape of the aircraft is also indicated. Each of the lamps is actuated from a central timing generator 17 which is connected by means of cables 19 to the respective light units 20 at the different light positions 1 through 6. Since the cables 19 must be interconnected through the aircraft in such a manner that in many cases they are beside other cables for long distances, it is undesirable to pass heavy currents through the cables because of the losses incurred and the variations of wave shape, together with the possibility of electrical interference with other circuits. Therefore in the system described hereinafter, low current transmission of pulses along the cables 19 is provided in order to avoid the losses due to high currents or the interference from the high intensity magnetic field set up in response thereto.

Figure 2:
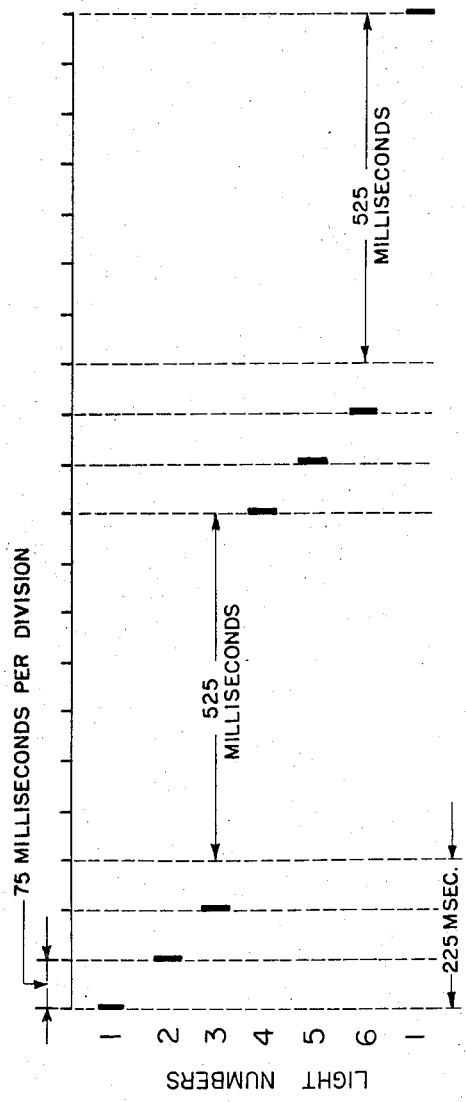
Fig. 2 is a typical timing sequence pattern which provides for identification of the direction of travel of the aircraft by providing a flashing sequence of lights on the aircraft from aft to fore.

The timing sequence of a lamp array as shown in Fig. 1 may be typically of the nature outlined in the timing chart in Fig. 2. Thus it is assumed that three lamps are actuated in sequence on top of the fuselage during 75 millisecond periods, and that a waiting period of 525 milliseconds is provided in one scanning cycle before the three lamps are flashed in a similar sequence on the bottom of the fuselage. Although it is to be recognized that other timing sequences might be provided for operating a system of aircraft warning lamps, this particular system is believed to display those conditions and techniques required for construction of aircraft warning systems. It is noted that simplification of circuitry may be accomplished if a timing pattern is chosen such that the entire sequencing of the six lamps is accomplished in a single scanning cycle.

Figure 3:
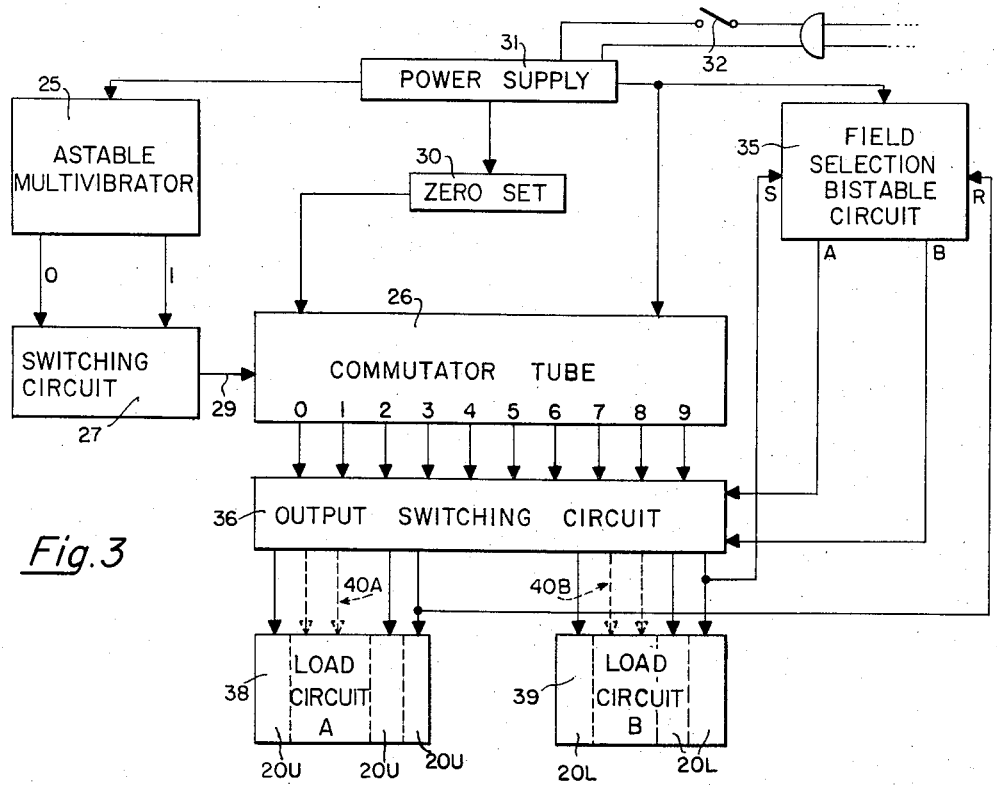
Fig. 3 is a block system diagram of the electronic switching system utilized for actuating the aircraft warning lights.

A typical system provided for accomplishing the illustrated timing sequence is shown in block diagram in Fig. 3. The timing of this system is chosen by means of an astable state multivibrator 25 which provides generally symmetrical pulses at the respective output terminals 0 and 1 connected to the switching circuit 27. The switching circuit serves to actuate the commutator tube 26 throughout the ten output positions in sequence. Thus if the astable state multivibrator 25 has a period of 150 milliseconds, switching output pulses on the lead 29, as applied to the commutator tube 26, will occur every 75 milliseconds as shown on the timing sequence chart of Fig. 2. The commutator tube is initially indexed by the zero setting circuit 30 to its reference position whenever the power supply circuit 31 is actuated, such as by means of the "on-off" switch 32. The power supply circuit provides operating potential for the commutator tube 26, multivibrator 25, and the field selection bistable circuit 35.

In order to provide flexibility in sequencing of output load circuits, an output switching circuit 36 is provided for connecting various ones of the output positions 0 through 9 of the commutator tube to the respective load circuits 38 and 39. As the switching problems or timing patterns become complex, it is difficult to provide simple circuits for operating the commutator tube to produce the desired load circuit sequencing pattern. Accordingly increased flexibility is provided to the output switching circuit by providing a field selection device 35, which is in this embodiment a two position bistable state circuit such as the well known flip-flop circuit. Therefore a first field, comprising a scanning cycle through the ten commutator tube positions, is designated for selection in response to a signal at the output lead of the field selection load circuit A. Whenever field A occurs, one switching pattern may be connected to the load circuit A from the commutator tube 26 through switching circuit 36, while in the successive field B a different switching pattern is connected to load circuit B.

In order to provide for automatic field selection operation, the input switching terminals for the respective set (S) and reset (R) terminals of the bistable circuit 35 are coupled respectively to the last switching position of the respective load circuits B and A, so that upon completion of the load circuit sequence at B, the field selection circuit will establish the next switching sequence at load circuit A. If the sequencing times are tied in with a single scanning cycle of the commutator tube 26, the complement (set and reset) terminals of field selection circuit 35 may be tied to an output terminal of the commutator tube, such as output terminal 9.

Therefore, in the circuit of Fig. 3 a periodic scanning of the commutator tube from one sequential position to the next results, with a predetermined dwell time at each position being established by the operating frequency of the periodic multivibrator 25. Upon each scanning cycle of the commutator tube, a plurality of output signals will be developed corresponding to the respective commutator tube positions. This output signal pattern may be connected to one or more load circuits 38, 39 which require various pulse patterns. Each load circuit may be divided up into subloads, such as units 20U or 20L respectively, which are specifically referenced to the upper and lower fuselage lights shown in Fig. 1. It is seen that for the timing sequence shown in Fig. 2, the upper lights one, two and three will be actuated in three successive target positions of the commutator tube such as positions 7, 8 and 9 during incidence of field A. The 525 milliseconds time interval between sequencing of load circuit A and load circuit B is provided by the dwell time upon the first seven switching positions provided at commutator tube terminals 0 to 6. After leaving position 9, the field selection circuit 35 has shifted from its set position to its reset position to gate the output pulses at positions 7, 8 and 9 of the commutator tube to the lower fuselage units 20L of load circuit B. In each case as the output beam at the commutator tube leaves position 9, the corresponding set and reset impulses are applied to the field selection circuit so that load circuits A and B are connected into operative conditions on successive cycles of the scanning in commutator tube 26. As indicated by the dotted leads 40A and 40B further beam positions could be interconnected to the load circuits for providing more complex waveforms whenever desired. Thus, for example, the number of lamps could be extended to four if desired, by cutting down on the interval between operations of each succession of flashes.

Figure 4:
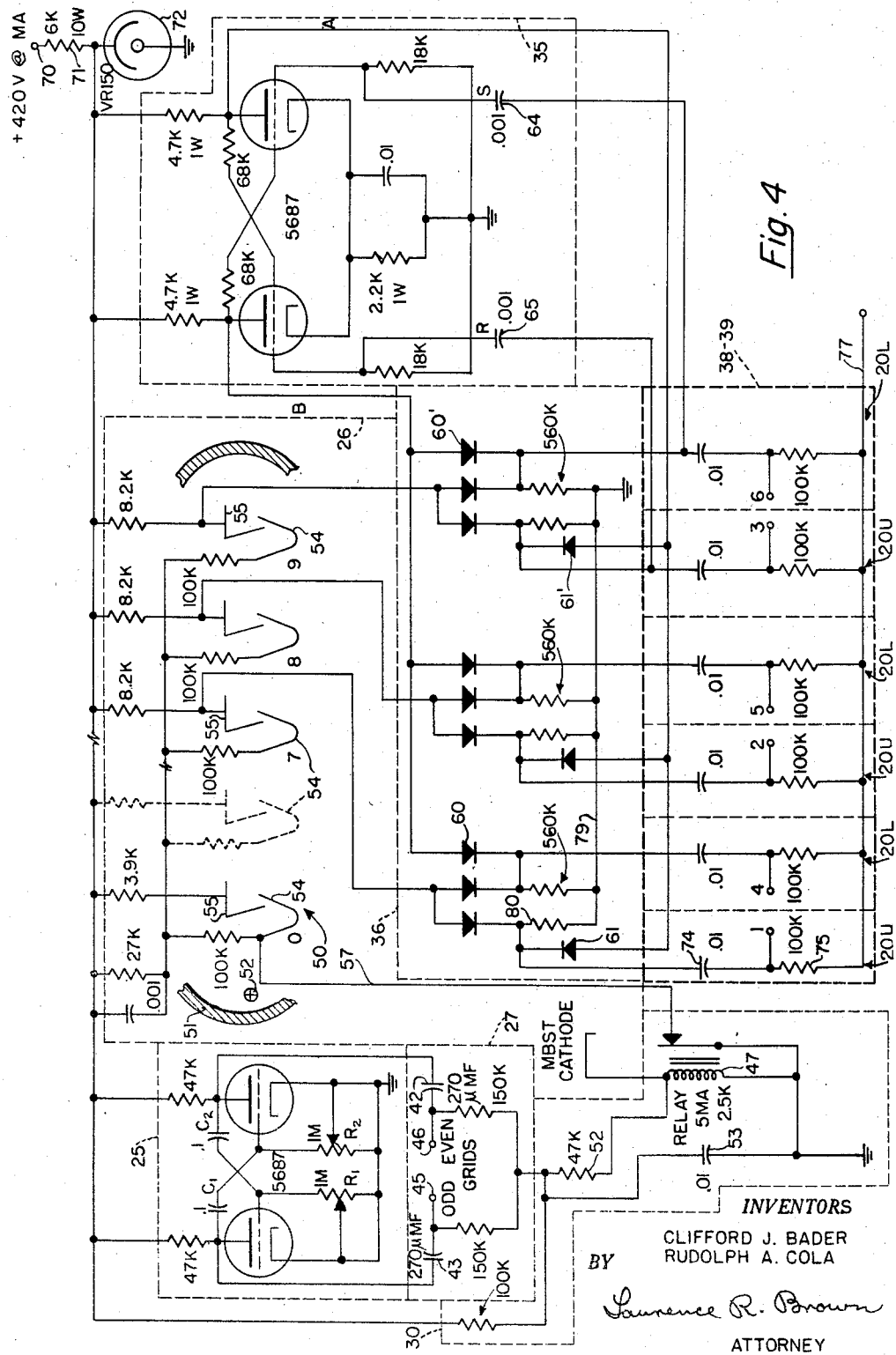
Fig. 4 is a detailed circuit diagram representative of the electronic switching circuit afforded in the particular embodiment of the invention.

A schematic circuit diagram of the switching system is shown in Fig. 4. In order to signify in Fig. 4 the relationship with the block diagram of Fig. 3, each of the respective block diagram circuits is shown in dotted block form with similar reference characters. Thus the organization and operation of this system is evident from the considerations of Fig. 3, and the discussion in connection with Fig. 4 will relate solely to the aspects of the various circuits and elements contained in the specific embodiment thereof. In order to enable those skilled in the art to construct more readily a system embodying the invention and to understand the operation thereof, the circuit values of the components are shown in Fig. 4. It is to be understood however that certain variations of circuit values, and circuit connections may be made without departing from the spirit or scope of the present invention.

In connection with the astable state multivibrator circuit 25, a conventional circuit is shown employing a twin-triode vacuum tube. The nominal period of 150 milliseconds is determined by the time constants R1, C1 and R2, C2. The time constants may be initially adjusted by varying resistors R1 and R2. Fixed resistors may be used in this circuit if desirable, but in cases where exact timing is important, the variable resistors may be used for establishing exact circuit constant adjustment. In order to minimize the effects of the tube characteristics and to afford maximum stability of the circuit, the anode resistors of each tube section are made to have high resistance values. Output signals of the multivibrator 25 are coupled to the switching circuit 27 by means of capacitors 42 and 43 to separate sets of switching grids within the commutating tube, respectively labeled odd and even grids at terminals 45 and 46.

The commutating tube comprises a magnetron beam switching tube of the type described and claimed in the U. S. Patent 2,721,955 issued October 25, 1955 to Sin-Pih Fan et al. for Multi-position Beam Tube. Since this tube currently is available under RTMA tube type 6700 on the market, and is described in the patent, a detailed discussion of the various characteristics is not necessary for a complete disclosure in the present specification. However, certain features of the tube will be discussed in order to afford an adequate understanding of the invention.

To initially form a beam in this type of tube one spade electrode potential is decreased to substantially cathode potential. The zero setting circuit 30 provides this function by means of the relay 47. As the positive potential at terminal 70 is supplied a beam can be formed at the zero spade 54 because of the grounded relay contact. Whenever beam current flows however the relay opens the contact to thereby permit stepping of the beam in response to switching potentials. Should the beam become lost for any reason, similar action results in reforming the beam.

The relay additionally, with resistor 52 and capacitor 53, serves to provide positive biasing potential for the switching grids 45 and 46. This potential is reduced for switching by the signals from multivibrator 25.

The beam is stepped along from one position to another in the magnetron beam switching tube 50, which is surrounded by magnet 51 for supplying a magnetic field as designated at the arrow 52 entering the plane of the paper. Stepping occurs in response to application of pulses alternately at the odd and even grid terminals 45 and 46 in the manner described in the above mentioned patent. The beam switching tube comprises in addition to switching electrodes located in each beam position compartment, spade electrodes 54 and target electrodes 55. The target electrodes serve to receive the beam and provide an output signal at each position, whereas the spade electrodes serve to form and hold the beam locked into position until a switching impulse is received on a particular grid electrode identified at that position. These tubes normally have ten positions 0 through 9, and for purposes of simplicity the drawing is shown designating only positions 0, 7, 8, and 9. Each of the positions between 0 and 7 are indicated diagrammatically by the dotted electrode arrangement. Each of the intermediate positions has the same configuration as that in position 0, except for the indexing lead 57. Thus the astable state multivibrator 25 serves to step the beam from one position to another to arrive at corresponding target positions, wherein the dwell time in each target position is approximately 75 milliseconds when the period of the multivibrator 25 is 150 milliseconds. That is each period causes an output signal on the successive odd and even grids 45 and 46 which will cause the beam to step through two positions thereby arriving at two successive target electrodes within the tube 50. Thus it is seen by referring to the timing diagram of Fig. 2 that as the beam is stepped through positions 0, 1, 2, 3, 4, 5 and 6, the intermediate inactive period of 525 milliseconds is provided. Therefore no output terminals are utilized at the respective target electrodes 0 to 6, and accordingly the target load resistors are selected at 3.9 K ohms in order to provide a stable tube beam characteristic for the no-load periods. Likewise it is evident from Fig. 2 that the remaining three electrodes in positions 7, 8 and 9 will provide for a timing sequence for flashing either the group of upper lamps 1, 2 and 3 or the group of lower lamps 4, 5 and 6 upon successive scans of the beam across the scanning cycle of the ten tube positions. Since a load circuit is provided for triggering the lights in each of these positions, the target electrode resistors of 8.2 K ohms are provided which together with the load circuits establish the stable beam operation conditions for the beam switching tube. Because of the requirement for operating one set of lights 1, 2 and 3 during one scanning cycle and another set of lights 4, 5 and 6 through another scanning cycle, each of the target electrodes in positions 7, 8 and 9 is provided with two alternative load circuits. These load circuits are identified in the combined load block 38—39 for the respective lamp positions, and the reference characters 20U and 20L indicate respectively the trigger circuits for the upper series of lamps and the lower series of lamps.

In the switching circuit block 36 is provided a series of diode coincident gates for determining which of the dual load circuits, such as lamp circuits 1 and 4 for target electrode in position 7, is connected. Switching is accomplished by means of output signals arriving at either leads A or B of the bistable state flip-flop circuit 35. The respective gating diodes 60 and 61 gate in the load circuits 4 and 1 for actuation by the beam as it impinges upon the target electrode 55 in compartment position 7. Similar operation results for target electrodes 8 and 9 so that the successive impingement of the beam upon positions 7, 8 and 9 flash in sequence lights 1, 2 and 3 or 4, 5 and 6 depending upon the position of the output signal of field selection flip-flop circuit 35. It is seen that the load circuits are substantially identical for both fields and therefore there is no effective change upon loading of the target electrodes of the beam switching tube during any of the scanning cycles. This is important since a change of loading of the target electrode might under some circumstances cause instability of beam formation in the beam switching tube. It is therefore significant to provide a beam switching sequence which permits the use of alternate load circuits at similar electrodes on successive scanning cycles of the beam switching tube.

The flip-flop circuit 35 is actuated in a stable manner by triggering potentials for the set and reset terminals as provided through capacitors 64 and 65 respectively. In essence this flip-flop circuit operates as a binary counter, that is each successive pulse at the target electrode in position 9 is caused to switch the flip-flop from one of its stable positions to the other. This is done reliably without noise signals to untriggered electrodes of the flip-flop circuits by using the flip-flop output circuit itself to gate the trigger pulses to the single input circuit necessary for changing the condition of the tube of the circuit. Thus the reset lead is coupled to the output circuit for lamp 3 and the set lead is coupled to the output circuit for lamp 6, and the corresponding gating action of diodes 60' and 61' serves to send a trigger signal to only one trigger circuit at a time. This mode of operation provides for reliable operation of the bi-stable state flip-flop circuit 35 in response to input set and reset pulses for providing the binary counting operation necessary for performing the field selection function.

If the power supply is to be provided from a high voltage unregulated source of 420 volts at terminal 70, or similar voltage, a series resistor 71 and voltage regulator tube 72 is provided for maintaining the timing circuit stable over its range of operations. This circuit is not required wherever a stable source of 150 volts is provided.

In order to provide a trigger impulse for operating lights in the specified timing sequence, each of the output circuits 20U or 20L is provided with a series capacitor and resistor 74, 75. Since the common lead 77 to each resistor is held at minus 28 volts, the lower plate of the capacitor will tend to reach a steady state level of minus 28 volts. The top plate of the capacitor 74 will however, be held at either substantially the +150 volts level at the voltage regulator tube, or at a substantially lower potential supplied when the beam impinges upon the target electrodes of the beam switching tube. Normally in the absence of a beam, resistors 80 serve to hold the capacitor top plate at nearly 150 volts by current to the grounded lead 79. However when the beam impinges upon a respective load circuit target electrode, and the potential at the output lead of the flip-flop circuit is reduced in potential at the same time, the top plate of the capacitor 74 will proceed in a negative direction. This negative swing is neglected in operation of the following circuits because it will send to the grid of the trigger tube further into cut-off and have no effect thereupon. However as the beam leaves the particular target electrode the capacitor at its top plate will head for the plus B value of 150 volts again after its reduced value in response to beam current, and therefore provide an output positive pulse which serves as a positive trigger pulse for the circuits of Fig. 5.

Figure 5:
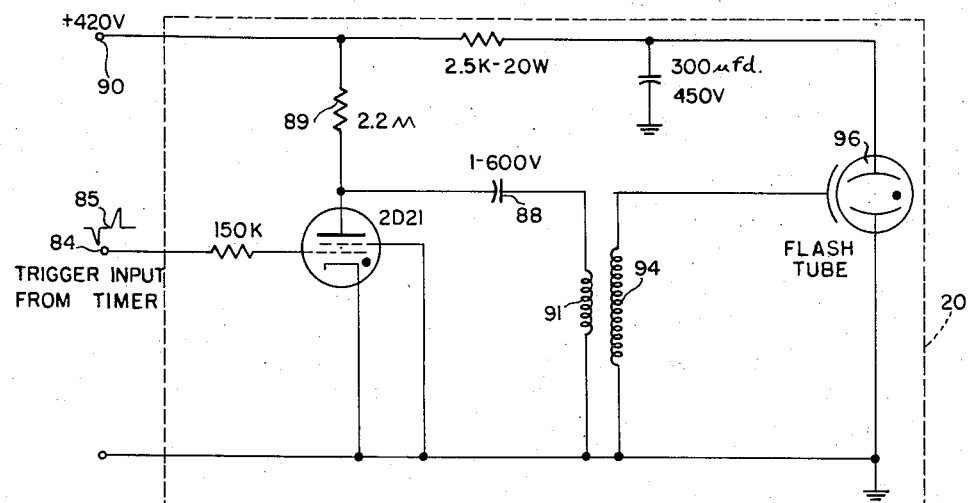
Fig. 5 is a schematic circuit diagram of a light assembly located at one of the various fuselage positions, for actuation from the centralized switching system.

The remote units 20 of Fig. 5 are located at various positions on the fuselage of an aircraft, and serve to operate from low current positive trigger pulses provided from the timing sequence generator by means of individual cables 19. Thus at the trigger circuit input terminal 84 a waveform similar to 85 is provided as a result of impingement of the beam upon a particular target of the beam switching tube to which the input trigger terminal 84 is connected by the proper switching network path. The positive going peak of the input waveform 85 therefore serves to fire the 2D21 thyratron tube and thereby cause it to provide a low impedance path for any charge on capacitor 88. When the tube is normally cut off it results in a slow charge of capacitor 88 through resistor 89 from the 420 volt source terminal 90 to approximately the full 420 volts. As the thyratron tube is fired therefore it permits the entire charge of capacitor 88 to quickly pass through the primary winding 91 of the flash tube transformer. This generates a high impulse at the secondary winding 94 which is used to provide the high intensity flash in tube 96.

The flash tube may be a presently commercially available tube manufactured by the General Electric Company and known by the designation PT119. The flashing duty cycle of tube is performed in such a manner the capacitor 88 will attain a substantially full charge after one flash and before the succeeding flash. In this manner each input trigger pulse will perform the function of causing the tube 96 to flash brilliantly, and the warning function hereinbefore described will be performed with excellent visibility in foggy and cloudy conditions or for night flying aircraft. It is evident therefore that in accordance with the present invention an improved aircraft warning system is provided which will give maximum visibility with great reliability in an all-electronic actuated system. Having therefore described the invention and its operation, those features of novelty are described with particularity in the appended claims.

What is claimed is:

1. A system for sequentially flashing warning lights on aircraft comprising in combination, a plurality of gaseous discharge lights adapted to be located at a plurality of separated locations on the exterior frame of an aircraft for outlining its contour; a flashing circuit for each gaseous discharge light comprising, a grid controlled thyratron tube having anode and cathode, a high voltage direct current source, a resistor connecting said source to the cathode and anode of said thyratron, a transformer coupling said thyratron to the gaseous discharge lights for flashing the lights in response to triggering of the thyratron at the control electrode, and a storage capacitor connected between the resistor and the transformer for charging slowly from the source and for discharging rapidly through the thyratron with large current flow when triggered, said flashing circuits located in proximity to the gaseous discharge lights at the different locations to assure low current flow in interconnecting leads from the direct current source; a central timing generator connected for sequentially flashing the lights in a predetermined pattern by triggering the thyratron tube grid circuits from pulses presented with a duty cycle such that the capacitor becomes substantially fully charged from the direct current source between successive pulses at any one thyratron grid, said generator comprising, a multi-position magnetron beam switching tube, each position having a switching electrode, a beam forming and hold electrode, a target electrode, and a periodic switching voltage source connected to said switching electrodes for advancing the beam from position to position with a predetermined dwell period on each target electrode; and output circuits for developing triggering impulses for respective ones of said thyratron grids in response to beam impingement at corresponding ones of a plurality of said targets, each output circuit comprising a series capacitor and resistor coupled to a target electrode whereby the voltage increases across the resistor as the beam leaves the target electrode to thereby provide a positive voltage impulse capable of discharging the thyratron, and a voltage conveying low current circuit connecting each output circuit to its corresponding remotely located thyratron grid to pass said voltage impulse thereto.

2. A system for sequentially flashing warning lights on aircraft comprising in combination, a multi-position electron beam device, means for switching the electron beam from one successive position to the next, a periodic source of switching signals coupled to the switching means to cause the beam to progressively scan from position to position, means responsive to beam current to establish a reference position, means connecting the positions in an output network for sequentially operating a plurality of positions, warning light trigger circuits coupled to the output network positions, and a field selection device coupled to the output network for actuation to selectively connect different sets of warning light trigger circuits to the output network positions for respective actuation of the different sets responsive to the scanning of the beam during successive scanning cycles of the multi-positions of the beam.

3. A system for sequentially flashing warning lights on aircraft comprising in combination, a multi-position magnetron beam switching tube, indexing means for forming a beam and setting the tube to a reference position, means responsive to beam current for conditioning the tube for switching from one position to another, a periodic switching circuit for advancing the beam cyclically from position to position with a predetermined dwell time upon each position, an array of warning lamps adapted to be mounted on an aircraft, trigger circuits for each warning lamp comprising a gaseous tube and chargeable capacitor supply circuit, and coupling means connecting each trigger circuit to one of the beam tube positions to actuate warning lamps by triggering the gaseous tube to discharge the capacitor supply circuit responsive to beam impingement at a corresponding position so that a periodic flashing pattern results.

4. An aircraft warning system comprising in combination, a plurality of gaseous discharge lights located at a plurality of separated positions on the exterior frame of an aircraft for outlining the contour thereof, a thyratron triggering circuit including a thyratron tube for each light located in proximity thereto, each triggering circuit comprising a transformer, a capacitor and the anode and cathode of said thyratron tube coupled in a closed circuit, and a direct current source coupled through a charging resistor to said capacitor, whereby the capacitor becomes charged through the resistor when the thyratron is quiescent and the capacitor becomes rapidly discharged through the transformer when the thyratron is triggered, a central timing generator, a voltage conveying low current trigger circuit coupling the timing generator to each of the thyratron tube control grids, and means in the central timing generator for distributing impulses for sequentially triggering the thyratron tubes in a timed order for displaying a predetermined flash pattern with said lights wherein any two of the triggering impulses at any one gaseous tube are separated in time a distance sufficient for the capacitor to become substantially fully charged through the resistor from the direct current source for response to the second of the two pulses after firing of the gaseous tube by the first of the two pulses.

5. A system as defined in claim 4 wherein the central timing generator comprises a multi-position beam switching tube having output electrodes at the different positions, a periodic switching source connected for stepping the beam from position to position, and a circuit coupling output electrodes of different positions of the beam tube to the trigger circuits to produce the predetermined flash pattern.

6. A system as defined in claim 5, wherein the beam switching tube operates in response to both magnetic and electric fields and includes a set of beam forming and holding electrodes and two sets of switching electrodes, a starting circuit for establishing a beam forming and holding potential on a reference beam forming and holding electrode in the absence of a beam, a circuit for disabling the starting circuit responsive to beam current and a periodic pulse generator connected to the alternate sets of switching electrodes for advancing the beam from position to position.

7. A system as defined in claim 6 wherein each output electrode of the different positions has connected thereto a gating circuit, and switching means is connected to the gating circuits for gating the output beam during the entire period of beam dwell upon the corresponding output electrodes.

8. A system as defined in claim 7 wherein each output electrode of the different positions has alternative output circuits connected thereto by the gating circuit, and the switching means in a commutating device selectively connected to actuate different ones of the output circuits.

9. A system as defined in claim 8 wherein the commutating device is connected to step in response to triggering impulses derived as the beam current in said switching electrode impinges upon a designated one of the beam tube output electrodes.

10. A system as defined in claim 9 wherein the commutating device is an electronic bistable state circuit having electron discharge devices cross connected so that only one device conducts heavily at a time, each discharge device having a control electrode, and the triggering impulses are connected by a gating circuit to change the state of the bistable circuit at one of the respective control electrodes in response to the relative conduction states of the discharge devices.

11. A multi-position switching system comprising in combination, a magnetron beam switching tube having a plurality of positions each defined by corresponding beam holding and target electrodes, a periodic switching circuit connected for advancing the beam from position to position, a referencing circuit for initially establishing the beam at a reference holding electrode, means disabling the referencing circuit responsive to beam current, means for periodically switching the beam from position to position with a predetermined dwell time upon each position, means coupling only a portion of the target electrodes to output circuits, each output circuit comprising a plurality of alternative load devices of similar characteristics, gating means coupled in each of the output circuits of the portion of target electrodes, and a gating potential generator coupling signals to the gating means for selectively actuating alternative ones of the output circuits at each of the target electrodes of said portion in response to application of the gating signals as the beam impinges upon the corresponding target electrode.

12. A timing sequence system comprising in combination, a multi-position magnetron beam switching tube, means for switching the beam from position to position, multi-condition field selection means for producing separate output signals for different scanning cycles through all the beam positions in said tube for selecting predetermined ones of said alternative load devices in different field selection conditions, means for connecting output circuits to selected patterns of beam tube positions, each output circuit comprising a plurality of alternative load devices, and means responsive to the field selection output signals to gate different load circuits during different scanning cycles of the beam without disturbing the loading characteristics of the beam tube output positions.

13. A system as defined in claim 12 wherein the switching means provides periodic signals for holding the beam a predetermined dwell time at each position, and the gating means provides gating signals to each load circuit with a duration exceeding the dwell time of the beam at the corresponding position in the tube.

References Cited in the file of this patent

UNITED STATES PATENTS

| | | |
|---|---|---|
| 257,403 | Starr | May 2, 1882 |
| 1,653,685 | Whittington | Dec. 27, 1927 |
| 2,487,781 | Bascom | Nov. 15, 1949 |
| 2,565,103 | Toulon | Aug. 21, 1951 |
| 2,642,553 | Williams | June 16, 1953 |